Sept. 5, 1950            S. L. LAURIN            2,521,640
FISH DRESSING MACHINE
Filed Sept. 21, 1948            2 Sheets-Sheet 2
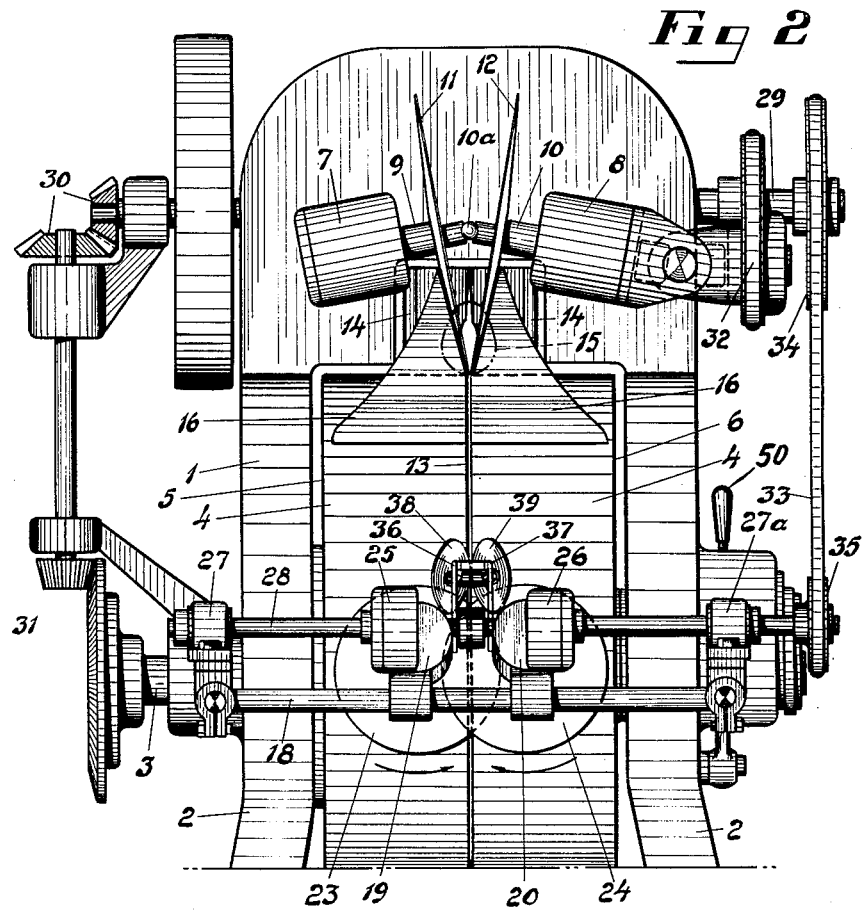
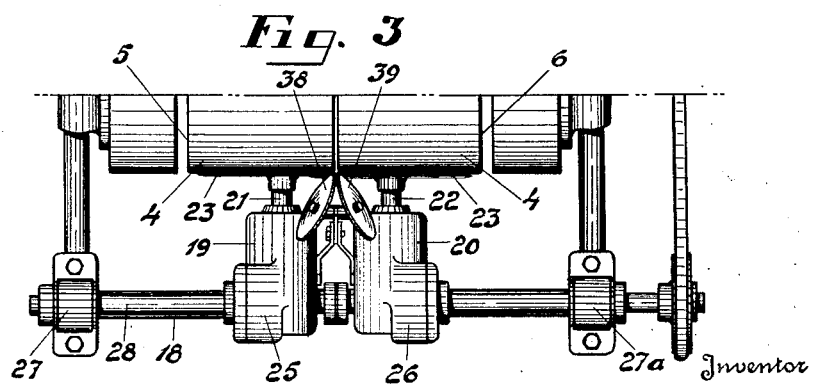
SVEN LENNART LAURIN
By Linton and Linton
ATTORNEYS Patented Sept. 5, 1950

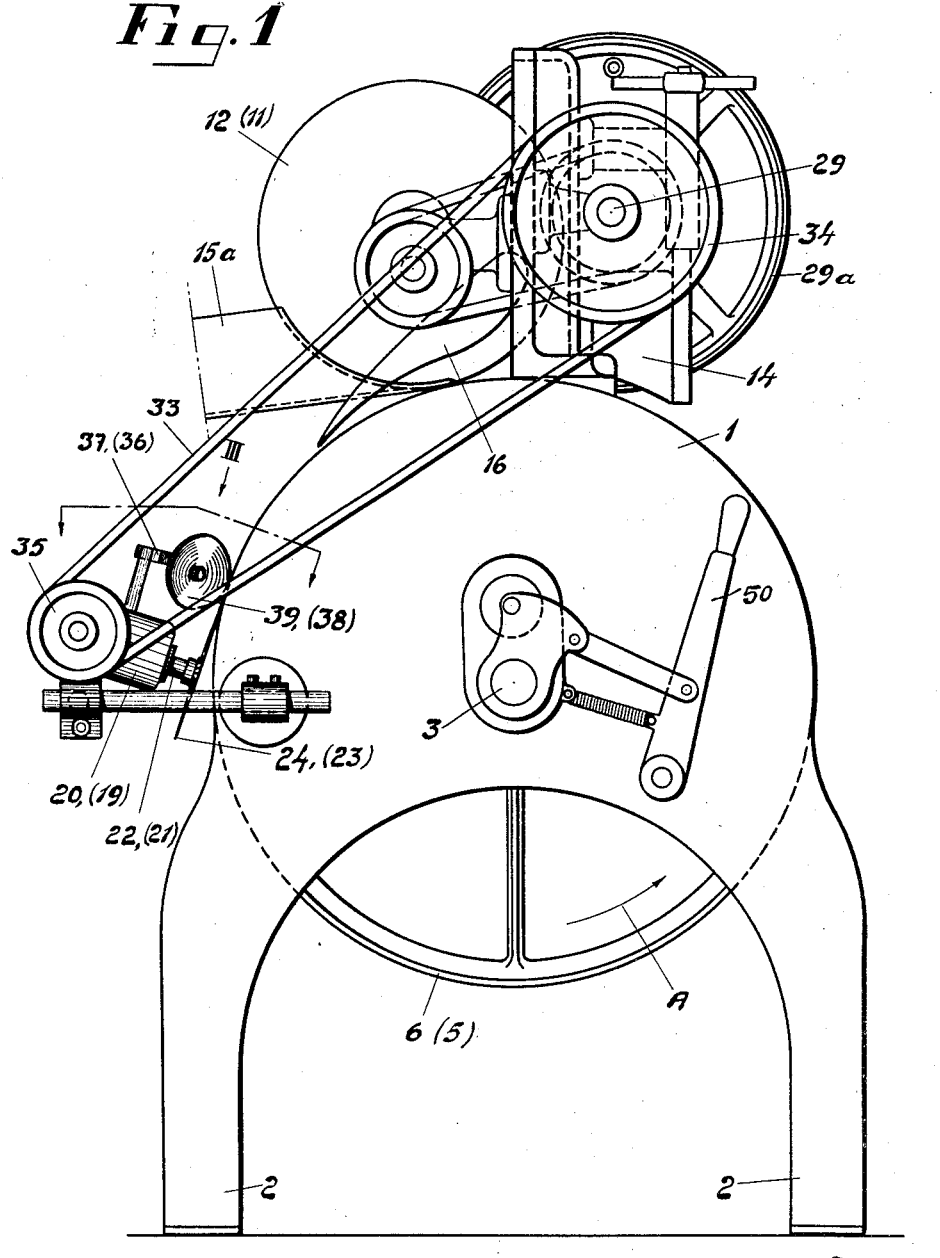

2,521,640

UNITED STATES PATENT OFFICE 2,521,640

FISH DRESSING MACHINE

Sven Lennart Laurin, Göteborg, Sweden

Application September 21, 1948, Serial No. 50,291
In Sweden March 15, 1947

3 Claims. (Cl. 17—3)

The present invention relates to fish dressing machines of the kind set forth in our copending application filed on even date herewith, Serial No. 50,292 and in which the fish to be dressed is jammed by its tail portion between two coaxial rotatable drums against which it rests on its back, and at the periphery of which drums there are provided two circular knives so disposed in the path of travel of the fish as to remove the entrails and backbone of the fish, and wherein, behind said knives, two rotatable skin removing circular discs are disposed substantially tangentially in relation to the drums and between which and the knives there are provided deflecting means adapted to flatten out the side portions of the fish over the drums after said fish has passed said knives, so that the skin removing discs separate the flesh (fillets) of the side portions of the fish thus flattened out. For the purpose of this specification the front is reckoned to be the direction of rotation of the drums, i. e. the direction from which the peripheries of the drums are moving, and the back is consequently the direction towards which the drum peripheries are moving.

The invention is broadly characterized in that there are rotationally mounted in front of the skin removing discs two circular discs situated one at each side of the vertical plane through the space between the drums and so inclined in relation to each other that their edges will be situated near each other at a point near the circumference of the drums.

These inclined discs will slightly separate the side fillets of the fish flattened out over the drums from each other, so that the work of the skin removing discs will be facilitated in separating from the skin perfect fillets without risk of incisions in the skin or of portions of the skin remaining on the fillets. Furthermore, the said inclined discs keep the tail portion of the passing fish down against the drums, preventing portions of said tail portion from being cut off by the skin removing discs, which portion thus remains with the fillets separated from the skin.

In the accompanying drawings an embodiment of the invention is shown by way of example, and in said drawings:

Figure 1 is a side elevation of the fish dressing machine;

Figure 2 is a view of the machine shown from the back; and

Figure 3 is a plan view of certain elements of the machine hereinafter described.

In the drawings 1 designates a frame-work supported by legs 2 and in which a horizontal shaft 3 is journalled. On this shaft are mounted two drums 5 and 6 of equal size, each provided with a comparatively broad, cylindrical surface 4. Through a clutch arrangement controlled by the hand lever 50 the drums 5 and 6 may be caused to rotate with the shaft 3 and slide the same in opposite directions longitudinally thereupon in a manner as described in our British patent No. 493,419 dated October 7, 1938. By introducing the fish from the front of the machine, i. e. the right-hand of Figure 1, tail first with its back resting against the drums and the tail between the drums, and then pressing the drums against each other; the fish, from which the head has previously been cut off, will be caught by the drums which rotate in the direction of the arrow A in Figure 1. In bearings 7, 8 disposed above the drums there are mounted two rotation spindles 9, 10 projecting against each other and forming an obtuse angle with each other, the adjacent ends of said spindles being connected by means of a universal joint 10a. Each spindle carries a rotary knife 11, 12 in the form of a circular disc with sharpened edges, and the inclination of the spindles and the size of the knives are so chosen that the edges of the knives will be situated near each other at a point near the circumference of the drums in front of the space between the same. In front of the knives 11, 12 there are provided in known manner two swingable guiding plates 14 which guide the fish resting with its back against the drums in such a manner that its centre plane will coincide with the vertical plane through the space 13 between the drums, and the knives 11, 12 situated immediately behind the plates 14 will consequently form two cuts or incisions embracing the entrails and backbone of the fish (as indicated by the dotted line 15 in Figure 2) the fish passing the knives with the drums, the entrails and the backbone being caught by a trough 15a (Figure 1) situated behind the knives 11, 12. At the outer side of each knife 11, 12 there is provided a curved plate 16, which plates are adapted by their front edges to catch the side portions of the fish and deflect same over the surface of the drums.

Behind the rear edge of the deflecting plates 16 there are provided two bearings 19, 20 supported by a transverse rod 18 and in said bearings there are journalled two spindles 21, 22 directed towards the drums 5, 6 and each carrying a skin removing circular disc 23, 24, which is substantially tangentially disposed in relation to the respective drum. The spindles 21, 22 are driven through gears 25, 26 by a shaft 28 journalled in bearings 27, 27a, whereby the discs are rapidly rotated in the direction indicated by the arrows in Figure 2. The drums 5, 6, the knives 11, 12 and the discs 23, 24 are driven from a common main shaft 29, journalled in the frame and provided with a belt pulley 29a. To the drum shaft 3 the movement is transmitted by means of toothed gearings 30, 31, and to the spindle 10 of the knife 12 the movement is transmitted by a belt transmission 32. To the shaft 28 the movement is transmitted by means of a belt 33 running over a pulley 34 fixed to the shaft 29 and over a pulley 35 fixed to the shaft 28.

According to the invention there are provided in front of the skin removing discs 23, 24 to circular discs 38, 39 journalled on arms 36, 37, and symmetrically disposed on each side of a vertical plane through the space 13 between the drums, said discs being so inclined in relation to each other that the edges of the discs will be situated near each other at a point near the circumference of the drums and somewhat in front of the line, along which a plane coinciding with the axis of rotation of the drums and passing through the point of intersection between the axis of rotation of the discs 38, 39 crosses the cylindrical surface of the drums.

The edges of the discs 38, 39 are rounded off, and it will be evident that during their rotation caused by the passing fish they will slightly separate from each other the side fillets of the fish so as to facilitate the working of the discs 23, 24 in separating perfect fillets from the skin.

The invention is not limited to the embodiment described above and illustrated in the drawings but may be varied in details, and, for example, the drums may be replaced by equivalent means such as parallel bands.

What I claim is:

1. The combination with a fish dressing machine of the type having two coaxial rotatable spaced drums against which the fish rests on its back, and at the peripheries of which drums there are provided two circular knives so disposed in the path of travel of the fish as to remove the entrails and backbone of the fish, and wherein two rotatable skin removing circular discs are disposed substantially tangentially in relation to said drums and between which and the knives there are provided deflecting means adapted to flatten out the side portions of the fish over the drums after said fish has passed said knives, so that the skin removing discs separate the fillets from the skin of the side portions of the fish thus flattened out, comprising a pair of circular discs rotatably mounted adjacent said skin removing discs and between said skin removing discs and said deflecting means, said circular discs being positioned each on an opposite side of the vertical plane through the space between said drums, and said pair of discs being inclined in relation to each other with a portion of the edge of each disc being situated adjacent a corresponding portion of the other disc at a point adjacent the circumferences of said drums.

2. Improvements in fish dressing machines as claimed in claim 1, further characterized in that the inclination of said pair of discs is such that the point at which the edges of said discs are nearest each other is situated slightly in front of the line along which a plane coinciding with the axis of rotation of said drums and going through the point of intersection between the axes of rotation of said pair of discs crosses the cylindrical surface of said drums.

3. Improvements in fish dressing machines as claimed in claim 1, characterized in that edges of said pair of discs have a rounded cross-sectional configuration.

SVEN LENNART LAURIN.

No references cited.